(12) United States Patent
Kuzuoka

(10) Patent No.: US 10,013,954 B2
(45) Date of Patent: Jul. 3, 2018

(54) DISPLAY CONTROL DEVICE AND DISPLAY SYSTEM

(71) Applicant: JVC KENWOOD Corporation, Yokohama-shi, Kanagawa (JP)

(72) Inventor: Haruki Kuzuoka, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 15/789,307

(22) Filed: Oct. 20, 2017

(65) Prior Publication Data

US 2018/0040302 A1 Feb. 8, 2018

Related U.S. Application Data

(63) Continuation of application No. PCT/JP2016/001468, filed on Mar. 15, 2016.

(30) Foreign Application Priority Data

May 11, 2015 (JP) ................... 2015-096273
Jan. 14, 2016 (JP) ................... 2016-005137

(51) Int. Cl.
*G09G 5/36* (2006.01)
*B60K 35/00* (2006.01)
(Continued)

(52) U.S. Cl.
CPC ............ *G09G 5/363* (2013.01); *B60K 35/00* (2013.01); *G06F 3/147* (2013.01); *G08G 1/052* (2013.01); *G08G 1/096805* (2013.01); *G08G 1/096855* (2013.01); *G09B 29/106* (2013.01); *B60K 2350/106* (2013.01); *B60K 2350/1076* (2013.01); *B60K 2350/352* (2013.01)

(58) Field of Classification Search
None
See application file for complete search history.

(56) References Cited

U.S. PATENT DOCUMENTS

2005/0065779 A1* 3/2005 Odinak ................. G10L 15/30
704/201

FOREIGN PATENT DOCUMENTS

JP 2003-130657 A 5/2003
JP 2009-92520 A 4/2009
(Continued)

OTHER PUBLICATIONS

International Search Report for related PCT application No. PCT/JP2016/001468 dated Jun. 7, 2016.

*Primary Examiner* — Michelle Chin
(74) *Attorney, Agent, or Firm* — Procopio

(57) ABSTRACT

A vehicular display device according to the present invention includes a display panel, an information acquiring unit that acquires information on a vehicle; a navigation information acquiring unit that acquires navigation information; and a display controlling unit that displays the information on the vehicle and the navigation information on the display panel. When displaying map information contained in the navigation information behind the information on the vehicle displayed on the display panel, the display controlling unit displays at least two icons indicating positions included in the map information under route guidance in such a manner that the at least two icons do not overlap the information on the vehicle.

6 Claims, 6 Drawing Sheets

(51) Int. Cl.
    *G06F 3/147*     (2006.01)
    *G08G 1/052*     (2006.01)
    *G08G 1/0968*     (2006.01)
    *G09B 29/10*     (2006.01)

(56) References Cited

FOREIGN PATENT DOCUMENTS

| | | |
|---|---|---|
| JP | 2011-37310 A | 2/2011 |
| JP | 2015-016705 A | 1/2015 |

\* cited by examiner

DISPLAY CONTROL DEVICE AND DISPLAY SYSTEM

CROSS REFERENCE TO RELATED APPLICATION

This application is based upon and claims the benefit of priority from Japanese patent application No. 2015-096273, filed on May 11, 2015, and Japanese patent application No. 2016-005137, filed on Jan. 14, 2016, the disclosures of which are incorporated herein in their entirety by reference.

BACKGROUND

The present invention relates to a vehicular display device, and a method for controlling a display panel, in particular to a vehicular display device for displaying information on vehicle and navigation information, and a method for controlling a display panel for displaying information on vehicle and navigation information.

Recent years have seen a shift in instrument panels for automobiles and the like from mechanical meters to display devices, such as liquid crystal panels. Vehicular display device using liquid crystal panels or the like can provide various indications, also allowing changes in display mode and decorative displays. Japanese Unexamined Patent Application Publication No. 2015-016705 discloses a vehicular display device that displays an image of a meter on a screen of the display device that is mountable in a vehicle. In displaying the meter image in such a manner that the meter image is superimposed on a main image, the vehicular display device disclosed in Japanese Unexamined Patent Application Publication No. 2015-016705 is configured to determine importances of zones in the main image and to display the meter image in a zone in the main image having a low importance.

SUMMARY

An instrument panel for automobiles is generally located forward of a driver and downward of a windshield, being placed at a position that provides a noticeability during driving. In conventional practice, navigation information is displayed on a display screen that is placed in a center console or the like, but by displaying such navigation information on the instrument panel, it is possible to enhance the noticeability of the navigation information.

The navigation information however tends to increase in displayed area because the navigation information contains map information. Additionally, in the navigation information, current position information as well as the map information that contains periphery information change at any time as a vehicle travels. Therefore, to display information on the vehicle (speed information, etc.) and the navigation information on the instrument panel, the information on the vehicle and the navigation information need to be placed appropriately.

A vehicular display device according to the present embodiment includes: a display panel that is used as an instrument panel of a vehicle; an information acquiring unit that acquires information on the vehicle; a navigation information acquiring unit that acquires navigation information; and a display controlling unit that displays, on the display panel, the information on the vehicle acquired by the information acquiring unit and the navigation information acquired by the navigation information acquiring unit, wherein the display controlling unit displays, when displaying map information contained in the navigation information behind the information on the vehicle displayed on the display panel, at least two icons indicating positions included in the map information under route guidance in such a manner that the at least two icons sandwich the information on the vehicle so that the at least two icons do not overlap the information on the vehicle.

A method for controlling a display panel according to the present embodiment includes: a step of acquiring information on a vehicle; a step of acquiring navigation information; and a step of displaying the information on the vehicle and the navigation information on a display panel, wherein, in displaying the information on the vehicle and the navigation information on the display panel, map information contained in the navigation information is displayed behind the information on the vehicle displayed on the display panel, and at least two icons indicating positions included in the map information under route guidance are displayed in such a manner that the at least two icons sandwich the information on the vehicle so that the at least two icons do not overlap the information on the vehicle.

DETAILED DESCRIPTION

First Embodiment

Hereinafter, embodiments of the present invention will be described with reference to the accompanying drawings.

Figure 1:
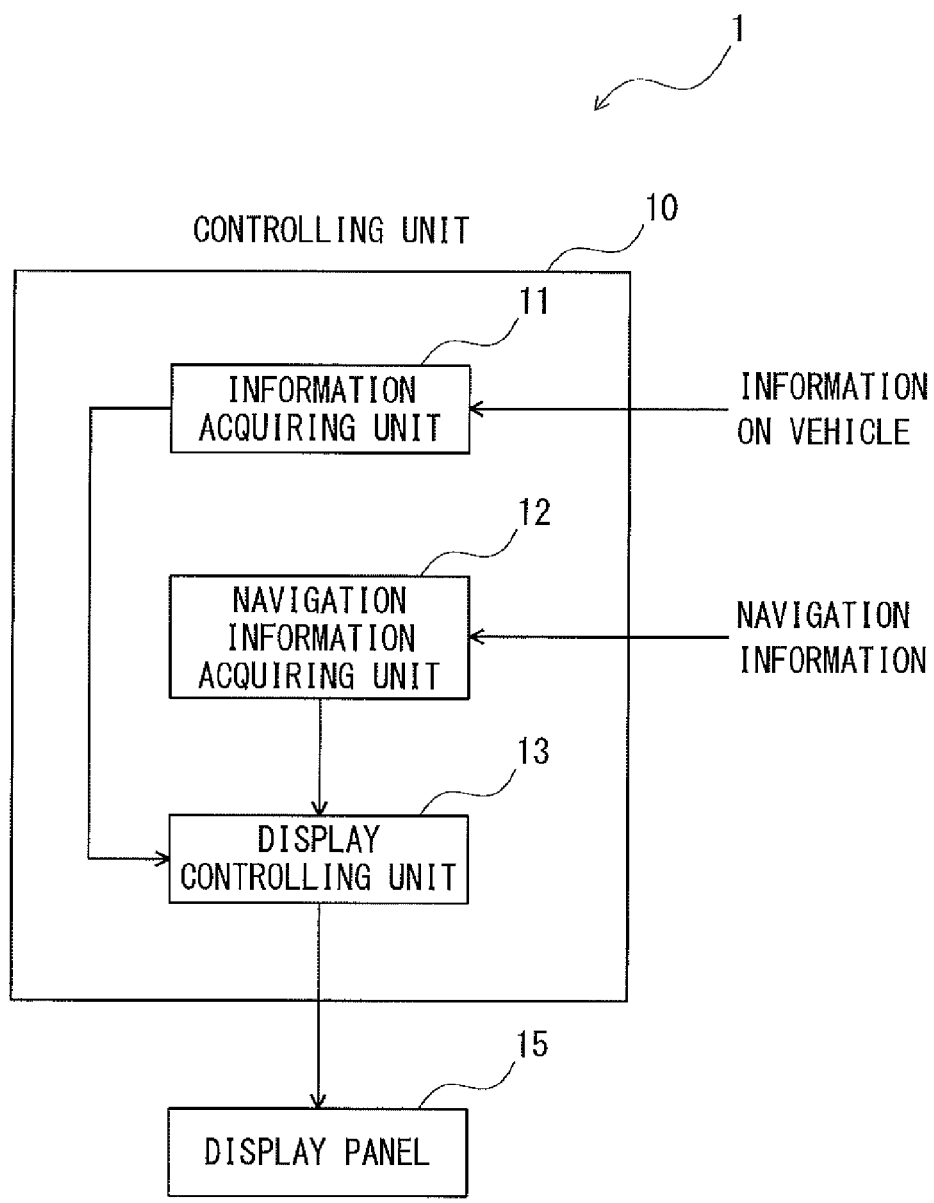
FIG. 1 is a block diagram illustrating a vehicular display device according to a first embodiment.

FIG. 1 is a block diagram illustrating an example of a vehicular display device according to a first embodiment of the present invention. As illustrated in FIG. 1, a vehicular display device 1 according to the first embodiment includes an information acquiring unit 11, a navigation information acquiring unit 12, a display controlling unit 13, and a display panel 15. Here, the information acquiring unit 11, the navigation information acquiring unit 12, and the display controlling unit 13 constitute a controlling unit 10 that controls the vehicular display device 1 and the display panel 15, and the controlling unit 10 is implemented using a central processing unit (CPU) or the like. The vehicular display device 1 according to the first embodiment is a display device displaying information on a vehicle such as the speed of the vehicle, the rotation speed of an engine, and a shift position, and navigation information, and is generally called an instrument panel, a cluster panel, or the like.

The information acquiring unit 11 acquires information on the vehicle. Here, examples of the information on the vehicle include various parameters such as vehicle speed information, engine speed information, shift position information, oil temperature information, remaining fuel information, and engine cooling-water-temperature information. The information on the vehicle may contain information necessary for the running of the vehicle as well as supplementary information. Examples of the supplementary information include weather information, date-and-time information, and traveling distance information (trip meter, odometer). The information on the vehicle described above is merely an example, and the information on the vehicle may contain information other than the information described above. For example, the information acquiring unit 11 can acquire the information on the vehicle through a controller area network (CAN) or the like that constitutes a network of the vehicle.

The navigation information acquiring unit 12 acquires the navigation information. Examples of the navigation information include map information, current position information, destination information, and transit point information. For example, the navigation information acquiring unit 12 acquires the navigation information from a navigation device (not illustrated). The example illustrated in FIG. 1 illustrates the case where the navigation information acquiring unit 12 acquires the navigation information from a navigation device (not illustrated) that is provided outside the vehicular display device 1, that is, the case where the navigation information acquiring unit 12 and navigation device are provided separately. The vehicular display device 1 according to the first embodiment may be however configured in such a manner that the navigation information acquiring unit 12 includes the navigation device (not illustrated). In this case, the navigation information acquiring unit 12 and the navigation device serve as a navigation functioning unit.

The display controlling unit 13 causes the display panel 15 to display the information on the vehicle supplied from the information acquiring unit 11 and the navigation information supplied from the navigation information acquiring unit. The display panel 15 is a display panel that is used as an instrument panel of the vehicle, and on the display panel 15, the information on the vehicle and the navigation information are displayed. For the display panel 15, for example, use can be made of a liquid crystal panel or an organic electroluminescence (EL) panel.

Figure 2:
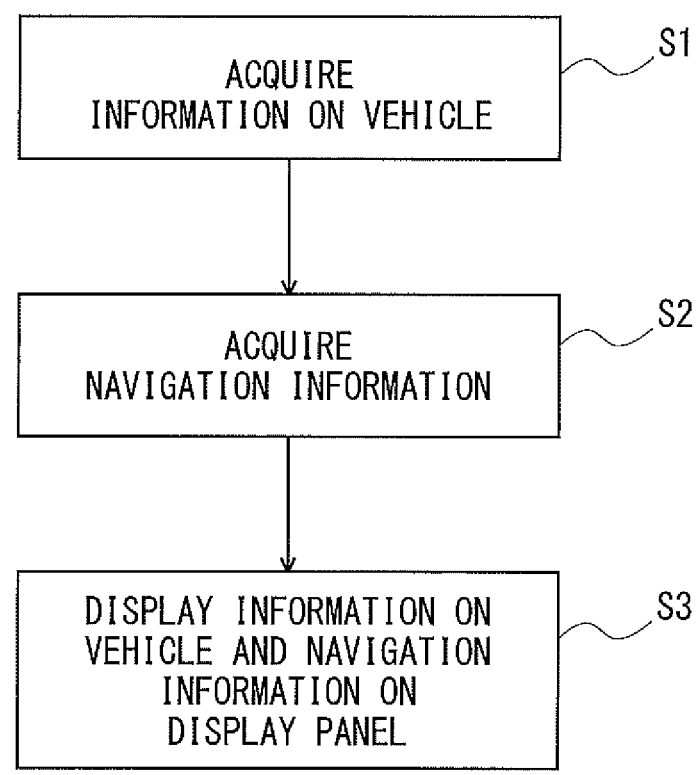
FIG. 2 is a flowchart used for describing the operation of the vehicular display device according to the first embodiment.

FIG. 2 is a flowchart used for describing the operation of the vehicular display device according to the first embodiment. First, the information acquiring unit 11 included in the vehicular display device 1 acquires information on the vehicle (step S1). For example, the information acquiring unit 11 acquires, through the CAN constituting the network of the vehicle or the like, the information on the vehicle. Next, the navigation information acquiring unit 12 included in the vehicular display device 1 acquires navigation information (step S2). For example, the navigation information acquiring unit 12 acquires the navigation information from the navigation device. Note that the step of acquiring the information on the vehicle (step S1) and the step of acquiring the navigation information (step S2) may be performed in an inverted order.

Next, the display controlling unit 13 causes the display panel 15 to display the information on the vehicle acquired by the information acquiring unit 11 and the navigation information acquired by the navigation information acquiring unit (step S3). The vehicular display device 1 according to the first embodiment repeats the operation of steps S1 to S3, so as to cause the display panel 15 display information on the vehicle and navigation information that are up to date. In other words, the information acquiring unit 11 and the navigation information acquiring unit 12 are configured to acquire the information on the vehicle and the navigation information at given time intervals, respectively. Therefore, the display controlling unit 13 can cause display panel 15 to display the up-to-date information on the vehicle and navigation information.

In the vehicular display device 1 according to the first embodiment, the display controlling unit 13 displays, when displaying map information contained in the navigation information behind the information on the vehicle displayed on the display panel 15, at least two icons indicating positions included in the map information under route guidance in such a manner that the at least two icons do not overlap the information on the vehicle.

Figure 3:
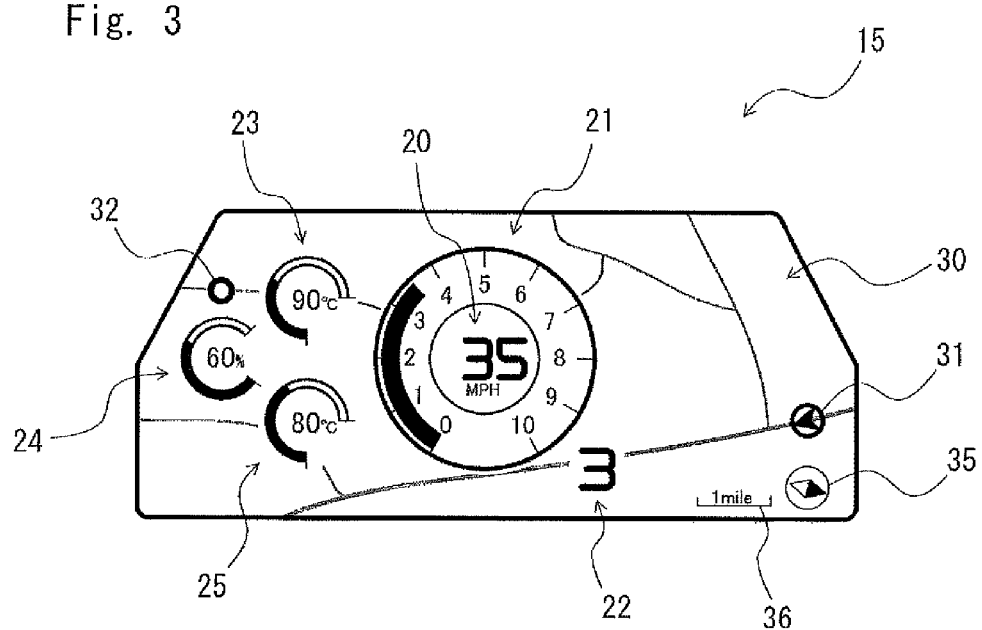
FIG. 3 is a diagram illustrating a displaying example of a display panel included in the vehicular display device according to the first embodiment.

FIG. 3 is a diagram illustrating a displaying example of the display panel 15. As illustrated in FIG. 3, the display panel 15 displays, as the information on the vehicle, displayed objects such as vehicle speed information 20, engine speed information 21, shift position information 22, oil temperature information 23, remaining fuel information 24, and cooling-water-temperature information 25 (hereinafter, also referred to as pieces of information on the vehicle 20 to 25). Behind the information on the vehicle displayed on the display panel 15, map information 30 contained in the navigation information, an icon 31 that indicates a current position of the vehicle, an icon 32 that indicates a destination of the vehicle, direction information 35, and scale information 36 are displayed.

At this point, the display controlling unit 13 displays the icon 31 indicating the current position of the vehicle and the icon 32 indicating the destination of the vehicle (i.e. two icons) in such a manner that they do not overlap the information on the vehicle 20 to 25.

The time when the icon 31 indicating the current position of the vehicle and the icon 32 indicating the destination of the vehicle are displayed simultaneously on the display panel 15 is a timing when a user sets the destination to the navigation device, a timing when the user gives a command for overall displaying in route guidance, a timing when the user decreases a scale in route guidance, and the like. In addition, also when the vehicle reaches the vicinity of the destination, the icon 31 indicating the current position of the vehicle and the icon 32 indicating the destination of the vehicle are displayed simultaneously on the display panel 15.

For example, the display controlling unit 13 acquires pieces of coordinate information on the respective pieces of the information on the vehicle 20 to 25 on the display panel 15, and pieces of coordinate information on the icon 31 indicating the current position of the vehicle and the icon 32 indicating the destination of the vehicle on the display panel 15. Using these pieces of coordinate information, the display controlling unit 13 then adjusts the displaying positions of the pieces of information on the vehicle 20 to 25 and the displaying positions of the icons 31 and 32, so that the icon 31 indicating the current position of the vehicle and the icon 32 indicating the destination of the vehicle do not overlap the pieces of information on the vehicle 20 to 25.

In this manner, in the vehicular display device 1 according to the first embodiment, when the map information contained in the navigation information is displayed behind the information on the vehicle displayed on the display panel 15, at least two icons indicating positions included in the map information under route guidance are displayed in such a manner as not to overlap the information on the vehicle. Therefore, it is possible to provide a vehicular display device that is capable of displaying information on a vehicle and navigation information appropriately, and to provide a method for controlling a display panel.

Figure 4:
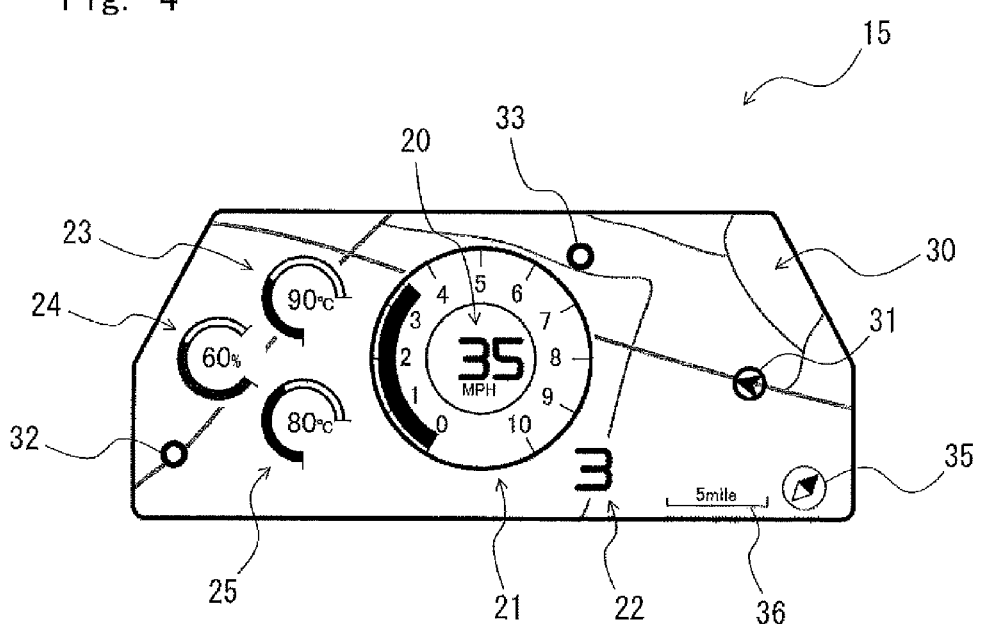
FIG. 4 is a diagram illustrating a displaying example of the display panel included in the vehicular display device according to the first embodiment.

In the vehicular display device according to the first embodiment, as illustrated in FIG. 4, the icon 31 indicating the current position of the vehicle, the icon 32 indicating the destination of the vehicle, and an icon 33 that indicates a transit point (i.e., three icons) may be displayed so as not to overlap the pieces of information on the vehicle 20 to 25. In addition, in the vehicular display device according to the first embodiment, the icon 32 indicating the destination of the vehicle and the icon 33 indicating the transit point may be displayed so as not to overlap the pieces of information on the vehicle 20 to 25.

At this point, the display controlling unit 13 may display at least one of the icon 32 indicating the destination of the vehicle and the icon 33 indicating the transit point at positions on an upper side than the icon 31 indicating the current position of the vehicle, on the display panel 15. For example, the displaying example illustrated in FIG. 3 illustrates the case where the icon 32 indicating the destination of the vehicle is displayed at a position on the upper side than the icon 31 indicating the current position of the vehicle, on the display panel 15. In addition, for example, the displaying example illustrated in FIG. 4 illustrates the case where the icon 33 indicating the transit point is displayed at a position on the upper side than the icon 31 indicating the current position of the vehicle, on the display panel 15.

The display controlling unit 13 may display at least two of the icon 31 indicating the current position of the vehicle, the icon 32 indicating the destination of the vehicle, and the icon 33 indicating the transit point in such a manner that the two icons sandwich the pieces of information on the vehicle 20 to 25. For example, in the displaying example illustrated in FIG. 3, the vehicle speed information 20, the engine speed information 21, and the oil temperature information 23 are placed between the icon 31 indicating the current position of the vehicle and the icon 32 indicating the destination of the vehicle. That is, the icon 31 indicating the current position of the vehicle and the icon 32 indicating the destination of the vehicle are displayed in such a manner as to sandwich these pieces of information on the vehicle.

In addition, for example, in the displaying example illustrated in FIG. 4, the vehicle speed information 20, the engine speed information 21, and the cooling-water-temperature information 25 are placed between the icon 32 indicating the destination of the vehicle and the icon 33 indicating the transit point. That is, the icon 32 indicating the destination of the vehicle and the icon 33 indicating the transit point are displayed in such a manner as to sandwich these pieces of information on the vehicle.

By placing the icon 31 indicating the current position of the vehicle, the icon 32 indicating the destination of the vehicle, and the icon 33 indicating the transit point in such a manner that they sandwich the information on the vehicle, it is possible to display these icons 31 to 33 on the display panel 15 using the entire display panel 15.

The display controlling unit 13 may change the scale or the displaying orientation of the map information 30 based on the positional relation between at least two of the icon 31 indicating the current position of the vehicle, the icon 32 indicating the destination of the vehicle, and the icon 33 indicating the transit point. This allows the at least two icons to be displayed in such a manner that they do not overlap the pieces of information on the vehicle 20 to 25.

For example, when the icon 31 indicating the current position of the vehicle illustrated in FIG. 4 comes close to the engine speed information 21, the display controlling unit 13 zooms the map information 30 in, so as to increase the distance between the icon 31 indicating the current position of the vehicle and the engine speed information 21 that are displayed on the map information 30. In addition, the display controlling unit 13 changes a direction of movement of the icon 31 indicating the current position of the vehicle illustrated in FIG. 4 into a direction different from a direction of the icon 31 toward the engine speed information 21, so as to inhibit the icon 31 indicating the current position of the vehicle from approaching the engine speed information 21.

The display controlling unit 13 may change the displaying positions and the displaying sizes of the pieces of information on the vehicle 20 to 25. For example, assuming that the maximum diameter of a piece of information on the vehicle to be moved (e.g., the engine speed information 21) is determined to be 100%, the piece of information on the vehicle may be moved in any direction by 10% at most. In addition, assuming that the maximum diameter of a piece of information on the vehicle to be moved (e.g. the engine speed information 21) is determined to be 100%, the piece of information on the vehicle may be zoomed out up to 80% at most.

Figure 5:
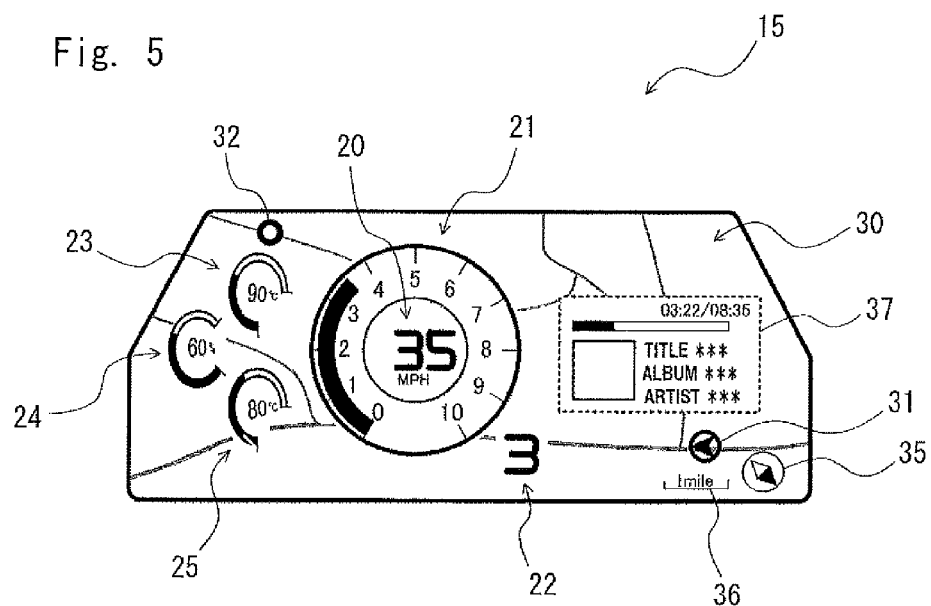
FIG. 5 is a diagram illustrating a displaying example of the display panel included in the vehicular display device according to the first embodiment.

For example, as a displaying example illustrated in FIG. 5, in the case of displaying, on the display panel 15, information 37 for operation to playback contents, the vehicle speed information 20, the engine speed information 21, and the shift position information 22 can be moved leftward by the deformation of the oil temperature information 23, the remaining fuel information 24, and the cooling-water-temperature information 25. Also in this case, the icon 31 indicating the current position of the vehicle and the icon 32 indicating the destination of the vehicle are displayed so as not to overlap the pieces of information on the vehicle 20 to 25. If it is difficult to display the icon 32 indicating the destination of the vehicle on the display panel 15, the icon 33 indicating the transit point may be displayed in place of the icon 32 indicating the destination of the vehicle.

Figure 6:
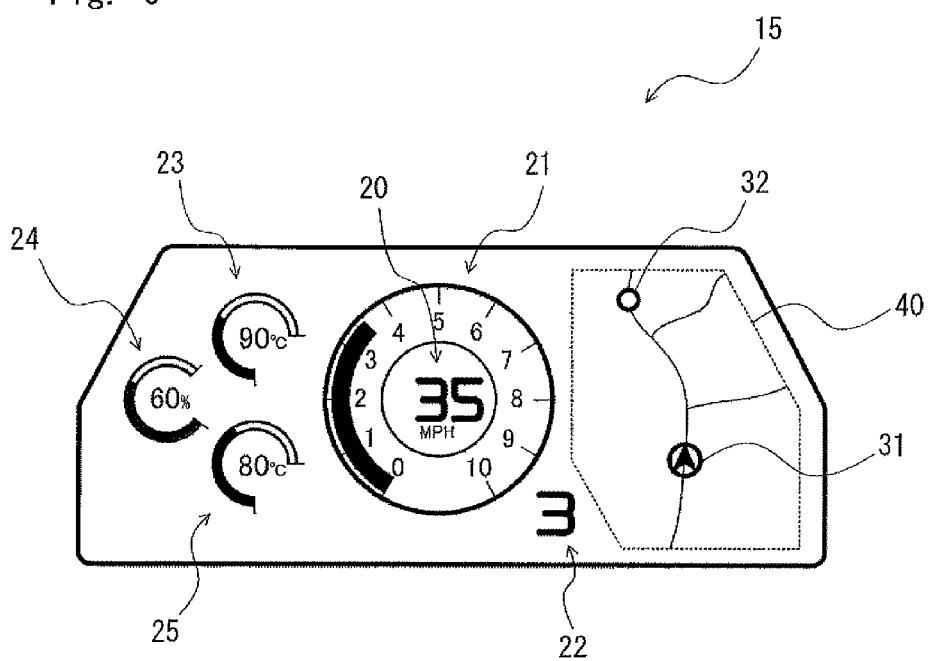
FIG. 6 is a diagram illustrating a displaying example of the display panel included in the vehicular display device according to the first embodiment.

When the vehicle reaches the vicinity of the destination, and the distance between the icon 31 indicating the current position of the vehicle and the icon 32 indicating the destination of the vehicle becomes a given distance or shorter, a mode of displaying the map information behind the information on the vehicle (see FIG. 3) may be switched to a mode of displaying the map information 40 in a part of the display panel 15, as illustrated in FIG. 6.

Second Embodiment

Next, a second embodiment of the present invention will be described. In the description of the second embodiment, matters that overlap with those in the first embodiment will be omitted.

In the second embodiment, the display mode of the display panel 15 differs from the display modes in the first embodiment described with reference to FIG. 3 to FIG. 5. The second embodiment shares with the first embodiment the purpose of displaying the icon 31 indicating the current position of the vehicle, the icon 32 indicating the destination of the vehicle, and the icon 33 indicating the transit point in such a manner that they do not overlap the pieces of information on the vehicle 20 to 25. In the first embodiment, the map information 30 is displayed being covered with the pieces of information on the vehicle 20 to 25. In contrast, in the second embodiment, the map information 30 is displayed being viewable by making the pieces of information on the vehicle 20 to 25 semitransparent.

Figure 7:
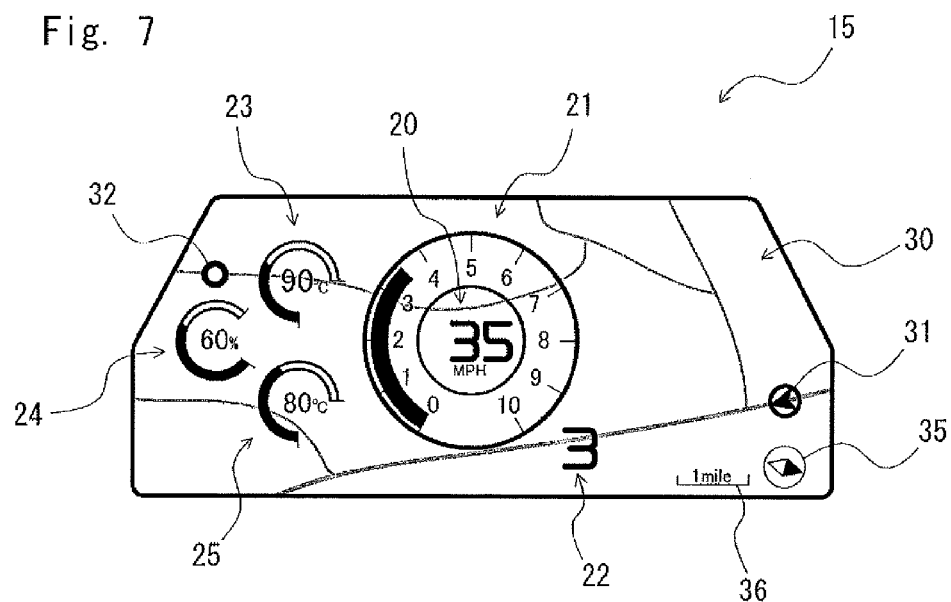
FIG. 7 is a diagram illustrating a displaying example of a display panel included in a vehicular display device according to a second embodiment.

FIG. 7 is a diagram illustrating a displaying example of the display panel 15 by a vehicular display device 1 according to the second embodiment. The displaying example illustrated in FIG. 7 shares the displayed contents with the displaying example illustrated in FIG. 3, but the pieces of information on the vehicle 20 to 25 are made semitransparent to make the map information 30 viewable. When the icon 31 indicating the current position of the vehicle, the icon 32 indicating the destination of the vehicle, and the icon 33 indicating the transit point are displayed so as not to overlap the pieces of information on the vehicle 20 to 25, routes present between the icons overlap the pieces of information on the vehicle 20 to 25 in some cases. Taking this regard into consideration, in the second embodiment, the pieces of information on the vehicle 20 to 25 are made semitransparent as described above. It is thereby possible to inhibiting a viewing of the map information 30 from being obstructed, allowing the overall view of the map information 30 to be grasped.

In FIG. 7, all of the pieces of information on the vehicle 20 to 25 are made semitransparent, but information on the vehicle to be made semitransparent may be, for example, information on the vehicle displayed at a position close to the icon 31 indicating the current position or information on the vehicle lying close to the icon 31 indicating the current position and lying in a direction of travel. In the case of FIG. 7, the vehicle speed information 20 and the engine speed information 21 that lie in the direction of travel between the icon 31 indicating the current position and the icon 32 indicating the destination of the vehicle are made semitransparent. With this displaying, it is possible to grasp map information planned to travel to at hand.

The transmittances of the pieces of information on the vehicle 20 to 25 in the second embodiment may be changed based on the vehicle speed information acquired by the information acquiring unit 11. For example, when the travelling speed of the vehicle is lower than 60 km/h, the transmittances of the pieces of information on the vehicle are set at about 50%, when the travelling speed of the vehicle is 60 km/h or higher, the transmittances of the pieces of information on the vehicle are set at about 30%, and when the travelling speed of the vehicle is 80 km/or higher, the pieces of information on the vehicle are displayed being nontransparent.

Third Embodiment

Next, a third embodiment of the present invention will be described. In the description of the third embodiment, matters that overlap with those in the first embodiment will be omitted.

In the third embodiment, the display mode of the display panel 15 differs from the display modes in the first embodiment described with reference to FIG. 3 to FIG. 5. The third embodiment shares with the first embodiment the purpose of displaying the icon 31 indicating the current position of the vehicle, the icon 32 indicating the destination of the vehicle, and the icon 33 indicating the transit point in such a manner that they do not overlap the pieces of information on the vehicle 20 to 25. In the first embodiment, the map information is displayed with a constant scale. In contrast, in the third embodiment, the map information is displayed with different scales in different zones where icons are positioned.

Figure 8:
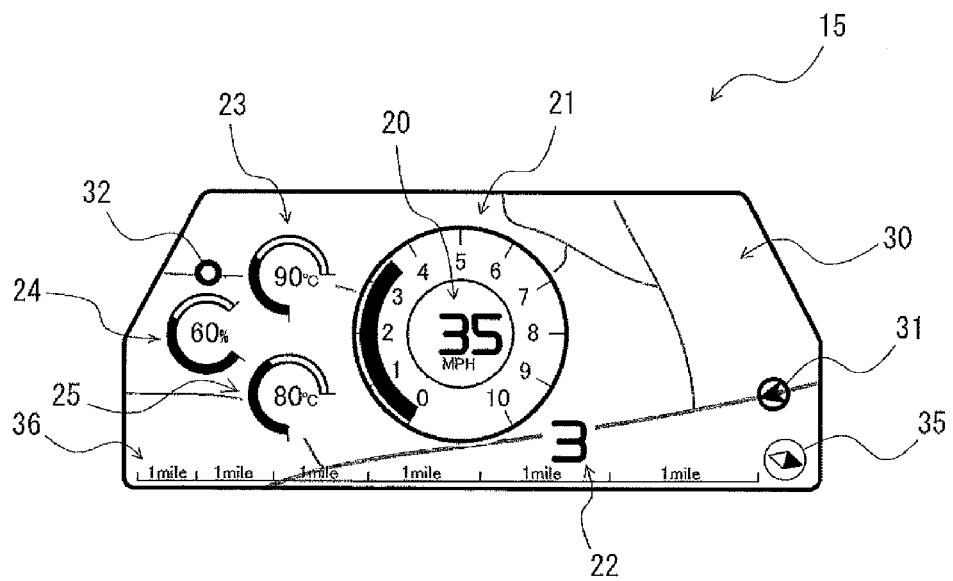
FIG. 8 is a diagram illustrating a displaying example of a display panel included in a vehicular display device according to a third embodiment.

FIG. 8 is a diagram illustrating a displaying example of the display panel 15 by a vehicular display device 1 according to the third embodiment. The displaying example illustrated in FIG. 8 shares the displayed contents with the displaying example illustrated in FIG. 3, but the display mode of the map information 30 is made to differ between the positions of icons. When the icon 31 indicating the current position of the vehicle, the icon 32 indicating the destination of the vehicle, and the icon 33 indicating the transit point are displayed so as not to overlap the pieces of information on the vehicle 20 to 25, routes present between the icons overlap the pieces of information on the vehicle 20 to 25 in some cases. Thus, in the third embodiment, a zone where the icon 31 indicating the current position lies is displayed as a detailed map, and a zone where the icon 32 indicating the destination of the vehicle lies is displayed as a wide area map. This displaying allows the map information 30 to be used appropriately even when the map information 30 and the pieces of information on the vehicle 20 to 25 are displayed on the same screen.

In FIG. 8, on the display panel 15, the icon 31 indicating the current position is displayed on a right side, and the icon 32 indicating the destination of the vehicle is displayed on a left side. Therefore, the map information is displayed in such a manner that the right side where the icon 31 indicating the current position lies is displayed with a large scale, and the left side where the icon 32 indicating the destination of the vehicle lies is displayed with a small scale. The scales are preferably changed continuously rather than stepwise. The scale information 36 may be displayed across the map information 30 as illustrated in FIG. 8, or only scale information on a zone where the icon 31 indicating the current position lies may be displayed. The description is made with reference to FIG. 8 about the case where the map information 30 is vertically divided into zones, and a scale of each of the zones is changed to be different from each other. In the third embodiment, however, the map information 30 may be horizontally divided into zones, and a scale of each of the zones may be changed. That is, in this case, the scales are made to differ in a vertical direction.

Fourth Embodiment

Next, a fourth embodiment of the present invention will be described. In the description of the fourth embodiment, matters that overlap with those in the first embodiment will be omitted.

In the fourth embodiment, the display controlling unit 13 uses the vehicle speed information acquired by the information acquiring unit 11 described with reference to FIG. 1, for generating the vehicle speed information 20 displayed on the display panel 15, and additionally, as an index for changing the displaying sizes of the pieces of information on the vehicle 20 to 25.

Figure 9:
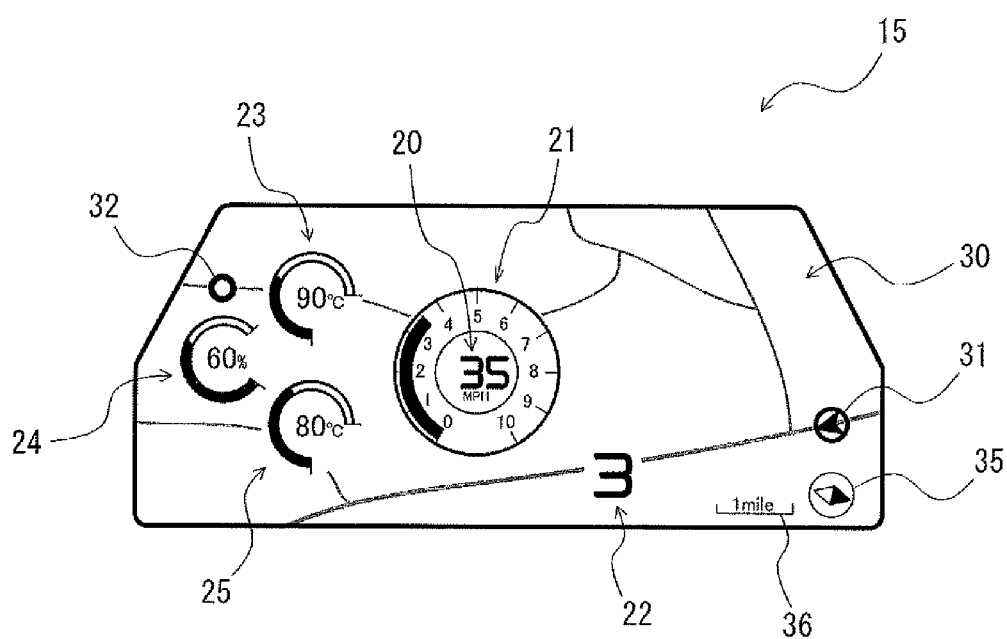
FIG. 9 is a diagram illustrating a displaying example of a display panel included in a vehicular display device according to a fourth embodiment.

FIG. 9 is a diagram illustrating a displaying example of the display panel 15 by a vehicular display device 1 according to the fourth embodiment. The displaying example illustrated in FIG. 9 shares the displayed contents with the displaying example illustrated in FIG. 3, but the displaying sizes of the vehicle speed information 20 and the engine speed information 21 are changed to be small by way of example. As a specific example, when the travelling speed of the vehicle is lower than 60 km/h, the vehicle speed information 20 and the engine speed information 21 illustrated in FIG. 9 are displayed in small displaying sizes (in comparison with the case of FIG. 3), and when the travelling speed is 60 km/h or higher, the vehicle speed information 20 and the engine speed information 21 are displayed in displaying sizes as illustrated in FIG. 3. With this displaying, it is possible to make the displaying of the overall view of the map information 30 easy to grasp when the travelling speed is relatively low. In addition, it is possible to display information important in high-speed travelling, such as the vehicle speed information 20 and the engine speed information 21, so that the information can be viewed appropriately when the travelling speed is relatively high.

In FIG. 9, the displaying sizes of the vehicle speed information 20 and the engine speed information 21 are changed to be small, and the displaying size of another piece of information on the vehicle may be similarly changed to be small. In addition, in the displaying example illustrated in FIG. 9, the vehicle speed information 20 and the engine speed information 21 are displayed being small and displayed at positions away from the icon 31 indicating the current position. That is, the speed information 20 and the engine speed information 21 are displayed to the left of center. With this displaying, it is possible to grasp map information on the vicinity of the current position appropriately.

The present invention has been described above according to the aforementioned embodiments. The present invention is however not limited to only the configurations of the aforementioned embodiments and naturally includes every type of transformation, modification, and combination that those skilled in the art can realize within the scope of claims of the present patent application. In addition, the embodiments can be implemented in combination with one another.

What is claimed is:

1. A vehicular display device comprising:
 a display panel that is used as an instrument panel of a vehicle;
 an information acquiring unit that acquires information pertaining to the vehicle;
 a navigation information acquiring unit that acquires navigation information; and
 a display controlling unit that displays, on the display panel, the information pertaining to the vehicle acquired by the information acquiring unit and the navigation information acquired by the navigation information acquiring unit,
 wherein the display controlling unit displays, when displaying map information contained in the navigation information behind the information pertaining to the vehicle displayed on the display panel, at least two icons indicating positions included in the map information under route guidance in such a manner that the at least two icons sandwich the information pertaining to the vehicle so that the at least two icons do not overlap the information pertaining to the vehicle.

2. The vehicular display device according to claim 1, wherein the display controlling unit displays at least two icons indicating positions included in the map information in such a manner that the at least two icons do not overlap the information pertaining to the vehicle, by making a displaying scale of the map information different among areas where the icons are positioned.

3. The vehicular display device according to claim 2, wherein the display controlling unit displays map information on an area where an icon indicating a current position, out of the at least two icons indicating the positions included in the map information, is positioned with a displaying scale larger than a displaying scale of map information on an area where another icon is positioned.

4. The vehicular display device according to claim 1, wherein the display controlling unit changes a displaying size of the information pertaining to the vehicle in accordance with the travelling speed of the vehicle acquired by the information acquiring unit.

5. The vehicular display device according to claim 4, wherein the display controlling unit increases the displaying size of the information pertaining to the vehicle with an increase in the travelling speed.

6. A method for controlling a display panel, the method comprising:
 a step of acquiring information pertaining to a vehicle;
 a step of acquiring navigation information; and
 a step of displaying the information pertaining to the vehicle and the navigation information on a display panel,
 wherein, in displaying the information pertaining to the vehicle and the navigation information on the display panel, map information contained in the navigation information is displayed behind the information pertaining to the vehicle displayed on the display panel, and at least two icons indicating positions included in the map information under route guidance are displayed in such a manner that the at least two icons sandwich the information pertaining to the vehicle so that the at least two icons do not overlap the information pertaining to the vehicle.

* * * * *